United States Patent
Cheikh et al.

(10) Patent No.: US 11,171,686 B2
(45) Date of Patent: Nov. 9, 2021

(54) NEAR-FIELD COMMUNICATION DEVICE

(71) Applicants: Continental Automotive France, Toulouse (FR); Continental Automotive GmbH, Hannover (DE)

(72) Inventors: Mohamed Cheikh, Toulouse (FR); Frédéric Lathiere, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/651,462

(22) PCT Filed: Oct. 2, 2018

(86) PCT No.: PCT/FR2018/052421
§ 371 (c)(1),
(2) Date: Jul. 1, 2020

(87) PCT Pub. No.: WO2019/069009
PCT Pub. Date: Apr. 11, 2019

(65) Prior Publication Data
US 2020/0336174 A1   Oct. 22, 2020

(30) Foreign Application Priority Data
Oct. 3, 2017   (FR) ...................................... 1759220

(51) Int. Cl.
*H01Q 21/24*   (2006.01)
*H01Q 7/08*   (2006.01)
(Continued)

(52) U.S. Cl.
CPC ........... *H04B 5/0031* (2013.01); *H01Q 1/243* (2013.01); *H04B 5/0037* (2013.01);
(Continued)

(58) Field of Classification Search
None
See application file for complete search history.

(56) References Cited

U.S. PATENT DOCUMENTS

| | | | | |
|---|---|---|---|---|
| 5,797,084 A | * | 8/1998 | Tsuru ..................... | H01Q 1/243 343/751 |
| 8,081,125 B2 | * | 12/2011 | Dokai .................... | H01Q 21/28 343/702 |

(Continued)

OTHER PUBLICATIONS

International Search Report and Written Opinion for International Application No. PCT/FR2018/052421, dated Dec. 13, 2018, 9 pages.

Primary Examiner — Tuan A Tran
(74) Attorney, Agent, or Firm — RatnerPrestia

(57) ABSTRACT

A device for near-field communication with a portable user apparatus, includes: a first communication antenna located on a first carrier; a first device for activating the first antenna located on a second carrier, which is facing the first carrier and mechanically connected to the first carrier by pads. The pads are made of conductive metal and the device also includes: a second antenna, a first winding portion of which is located on one end of the first carrier and a second winding portion of which is located on one end of the second carrier, the two ends facing one another. The first portion and second portion of each winding electrically connected by a pad, the second antenna emitting an electromagnetic field, a main component of which is perpendicular to a main component of the electromagnetic field emitted by the first antenna; and a second device for activating said second antenna.

11 Claims, 6 Drawing Sheets

(51) Int. Cl.
*G06K 19/077* (2006.01)
*H04B 5/00* (2006.01)
*H04W 4/80* (2018.01)
*H01Q 1/24* (2006.01)

(52) U.S. Cl.
CPC ......... *H04B 5/0056* (2013.01); *H04B 5/0075* (2013.01); *H04W 4/80* (2018.02)

(56) References Cited

U.S. PATENT DOCUMENTS

| | | | | |
|---|---|---|---|---|
| 8,517,280 | B2 * | 8/2013 | Owada | H01Q 1/2225 |
| | | | | 235/494 |
| 8,922,162 | B2 * | 12/2014 | Park | H02J 50/90 |
| | | | | 320/108 |
| 9,016,588 | B2 * | 4/2015 | Kaga | G06K 19/07758 |
| | | | | 235/492 |
| 9,281,118 | B2 * | 3/2016 | Konanur | H01F 38/14 |
| 9,582,693 | B2 * | 2/2017 | Yosui | H01Q 1/243 |
| 9,679,240 | B2 * | 6/2017 | Ikemoto | H01Q 1/40 |
| 9,692,128 | B2 * | 6/2017 | Kato | H01Q 1/2208 |
| 9,767,450 | B2 * | 9/2017 | Na | G06Q 20/3278 |
| 9,793,600 | B2 * | 10/2017 | Ikemoto | H04B 5/0031 |
| 9,859,053 | B2 * | 1/2018 | Lee | H02J 5/005 |
| 9,917,367 | B2 * | 3/2018 | Yosui | H01Q 1/2208 |
| 9,935,481 | B2 * | 4/2018 | Yamaguchi | H02J 50/40 |
| 9,972,909 | B2 * | 5/2018 | Sato | H01Q 21/06 |
| 10,020,673 | B2 * | 7/2018 | Yamaguchi | H02J 7/025 |
| 10,033,101 | B2 * | 7/2018 | Jang | H04B 5/0031 |
| 10,164,337 | B2 * | 12/2018 | Otsuki | H01Q 21/24 |
| 10,164,347 | B2 * | 12/2018 | Ito | H01Q 1/50 |
| 10,186,753 | B2 * | 1/2019 | Asou | H01Q 7/00 |
| 10,224,632 | B2 * | 3/2019 | Tenno | H01Q 7/00 |
| 10,601,133 | B2 * | 3/2020 | Lee | G06Q 20/3278 |
| 10,644,402 | B2 * | 5/2020 | Yosui | H01Q 1/2208 |
| 10,651,548 | B2 * | 5/2020 | Kaneko | H01Q 25/00 |
| 10,707,573 | B2 * | 7/2020 | Mikawa | H01Q 7/00 |
| 2014/0035793 | A1 * | 2/2014 | Kato | H01Q 7/06 |
| | | | | 343/867 |
| 2014/0253404 | A1 | 9/2014 | Ikemoto et al. | |
| 2015/0002088 | A1 * | 1/2015 | D'Agostino | H02J 7/0044 |
| | | | | 320/108 |
| 2016/0254589 | A1 * | 9/2016 | Ju | H01Q 1/2208 |
| | | | | 343/702 |

* cited by examiner

NEAR-FIELD COMMUNICATION DEVICE

CROSS REFERENCE TO RELATED APPLICATIONS

This application is the U.S. National Phase Application of PCT International Application No. PCT/FR2018/052421, filed Oct. 2, 2018, which claims priority to French Patent Application No. 1759220, filed Oct. 3, 2017, the contents of such applications being incorporated by reference herein.

FIELD OF THE INVENTION

The invention relates to a device for near-field communication with a portable user apparatus.

More particularly but not exclusively, the invention is applicable to inductive chargers for mobile devices, these chargers being intended to be installed on board a motor vehicle and including a near-field communication device for communication with a mobile apparatus once said apparatus has been placed on the receiving surface of the inductive charger.

BACKGROUND OF THE INVENTION

Magnetic coupling charging devices, which make it possible to charge mobile devices (cellphones, laptop computers, touchscreen tablets, digital cameras, etc.) wirelessly, are currently experiencing significant growth.

Conventionally, a magnetic coupling charging apparatus includes a conductor coil, referred to as the "primary antenna", which is connected to a charging module. During charging of a mobile device, the charging module forms a charging signal that makes it possible to channel an electric current, the intensity of which varies over time, through the primary antenna. The primary antenna that is thus supplied forms a variable magnetic field.

The mobile device includes a receiver module including a conductive coil, referred to as the "secondary antenna". When said secondary antenna is placed within the variable magnetic field formed by the primary antenna, an electric current is induced in said secondary antenna. This electric current makes it possible to charge an electrical accumulator connected to the secondary antenna, thus supplying current to the mobile device.

It is known practice to place a mobile device on a charging apparatus so as to charge the mobile device through induction, and so that it communicates at the same time as or after the charging period by near-field communication (NFC) with the electronic system on board the vehicle. This short-distance wireless communication (generally over a distance of a few millimeters) makes it possible, among other things, for the vehicle to download a particular user profile contained in the mobile device and thus to adjust elements of the vehicle according to this profile, for example to adjust the position of the driver seat in the vehicle, to program favorite radio stations, to modify the appearance of the instrument panel or to activate the "E-call" (emergency-call) function, etc.

To this end and as is known, these charging apparatuses comprise a dedicated radiofrequency antenna for inductive charging, referred to as the charging antenna, which is a WPC (Wireless Power Consortium) antenna, i.e. a wireless inductive charging antenna in accordance with the standards of this consortium, allowing inductive charging at frequencies ranging from 100 to 200 kHz, as well as another antenna of higher frequency, generally around 13.56 MHz, that is dedicated to this near-field communication. It may also be any other radiofrequency antenna allowing communication by short-distance coupling between the mobile device and the charging apparatus that is connected to the electronic system on board the vehicle.

In a known manner, the primary WPC charging antenna is centered in the middle of the charging device in order to be aligned with respect to the secondary antenna of the portable apparatus, which is itself also generally located in the center of said apparatus. The NFC antenna is generally arranged around the WPC antenna, all the way around the periphery of the charging device. Similarly, the NFC antenna of the portable apparatus is also located around the periphery of the back face of the portable device and is therefore located facing the NFC antenna of the charging device when the portable apparatus is placed on the charging device, which allows effective NFC.

The arrangement of the NFC antenna on the periphery of a carrier is not specific to inductive chargers. Indeed, in any near-field communication device, the NFC antenna is generally arranged on the periphery of the carrier, thereby providing a uniform communication zone over the entire surface of the device.

However, most smartphones brought onto the market recently no longer comprise an NFC antenna located on the periphery, but rather an NFC antenna located on an upper portion of the back face of the smartphone in order, inter alia, to facilitate NFC payment, for example. The user, holding their smartphone, thus tilts the top of their smartphone toward an NFC reader incorporated within a terminal in order to communicate with said terminal, for example to pay. This gesture is more ergonomic than that of placing the back face of the phone parallel to the surface of the NFC reader, in the case of the NFC antenna being wound around the periphery of the portable apparatus.

The placement of the NFC antenna only on an upper portion of the back face of a portable apparatus, i.e. off-center with respect to the WPC antenna, also makes it possible to decrease interference with said antenna.

However, effective NFC between a portable apparatus that comprises an NFC antenna located on only one of its peripheral edges and a charging device that comprises an NFC antenna located around the entirety of its periphery is substantially limited or even impossible.

If, in addition, the back face of the portable apparatus is covered with a chromed metal shell, added by the user, the presence of this metal interferes with the frequency of the NFC antenna of the charging device and causes it to be mismatched. NFC between the portable apparatus and the charging device is then no longer possible.

SUMMARY OF THE INVENTION

It therefore becomes necessary to design a near-field communication device which functions for any type of portable user apparatus and hence also for these new smartphones which are fitted with an NFC antenna on the upper portion of their back face, so as to be able to communicate effectively with said smartphone using NFC.

An aspect of the invention aims to overcome this problem of the prior art.

An aspect of the invention proposes a device for near-field communication with a portable user apparatus, comprising:
a first near-field communication antenna located on a first carrier;

first means for activating said first antenna that are located on a second carrier, which is located facing the first carrier and mechanically connected to said first carrier by pads,
the device being noteworthy in that the pads are made of conductive metal and in that it also comprises:
   a second near-field antenna, a first winding portion of which is located on one end of the first carrier and a second winding portion of which is located on one end of the second carrier, the two ends being located on one and the same side of the device; and the first portion and second portion of each winding being electrically connected by a pad made of conductive metal, such that the second antenna emits an electromagnetic field, a main component of which is perpendicular to a main component of the electromagnetic field emitted by the first near-field communication antenna;
   second means for activating said second communication antenna.

The first carrier may consist of a housing bottom or cover, and the second carrier may be a printed circuit board.

Preferably, the first carrier and the second carrier are printed circuit boards.

In one particular embodiment, the first winding portion comprises a distance separation between two of its consecutive windings.

In a first embodiment, the device comprising two second near-field communication antennas, which are located at the opposite ends of the first and second carriers, the second activation means comprising:
   a radiofrequency switch (Int) having two positions: a first position in which the switch is connected to first frequency-matching means and to the first communication antenna, and a second position in which the switch is connected to second frequency-matching means and to the two second communication antennas;
   switching means comprising two transistors, said switching means each being connected to one of the second NFC antennas and also comprising a control inverter;
   a binary control of the switching means, which is connected to a control inverter, allowing one second communication antenna to be activated and the other second communication antenna to be deactivated simultaneously;
   means for controlling the radiofrequency switch (Int) and the binary control.

In a second embodiment, the second activation means comprise at least one passive resonator that is electromagnetically coupled on one side to the first communication antenna, antenna-matching means and a transistor, which are electrically connected on one side to the second communication antenna and on the other side to the resonator.

An aspect of the invention also relates to an inductive charger comprising an inductive charging antenna, noteworthy in that the first communication antenna surrounds the inductive charging antenna and it that said inductive charger comprises a near-field communication device according to any one of the features given above.

An aspect of the invention also applies to any portable user apparatus characterized in that it comprises a near-field communication device according to any one of the features given above.

Lastly, an aspect of the invention also applies to any motor vehicle comprising a near-field communication device which may or may not be incorporated within an inductive charger according to any one of the features given above.

BRIEF DESCRIPTION OF THE DRAWINGS

Other aims, features and advantages of aspects of the invention will become apparent upon reading the following description provided by way of non-limiting example and upon examining the appended drawings, in which.

DETAILED DESCRIPTION OF THE PREFERRED EMBODIMENTS

Figure 1:
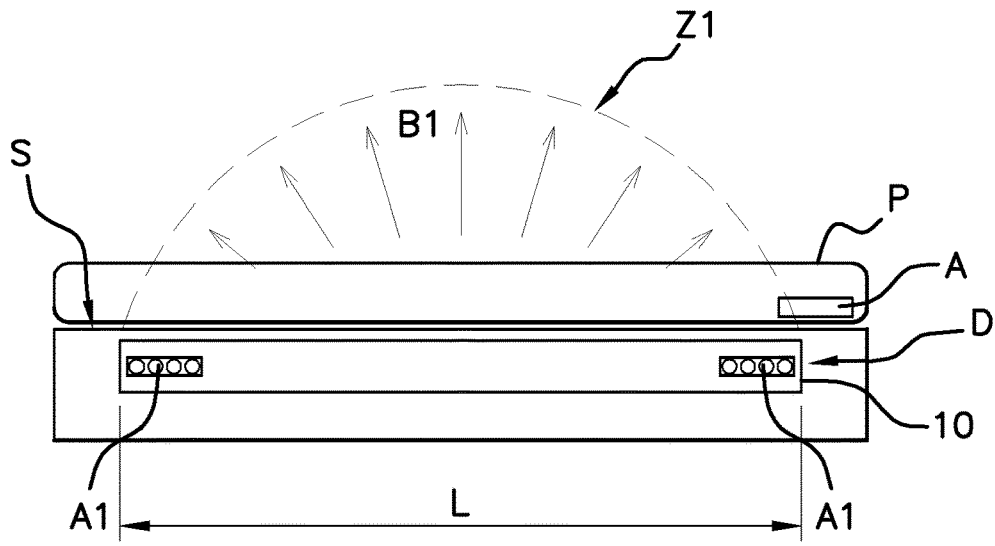
FIG. 1 shows a portable user apparatus P placed on a near-field communication device D of the prior art, said apparatus P comprising a near-field communication antenna A located at the top of its back face, and said device D comprising a first near-field communication antenna A1 arranged on the periphery of said device.
Figure 4:
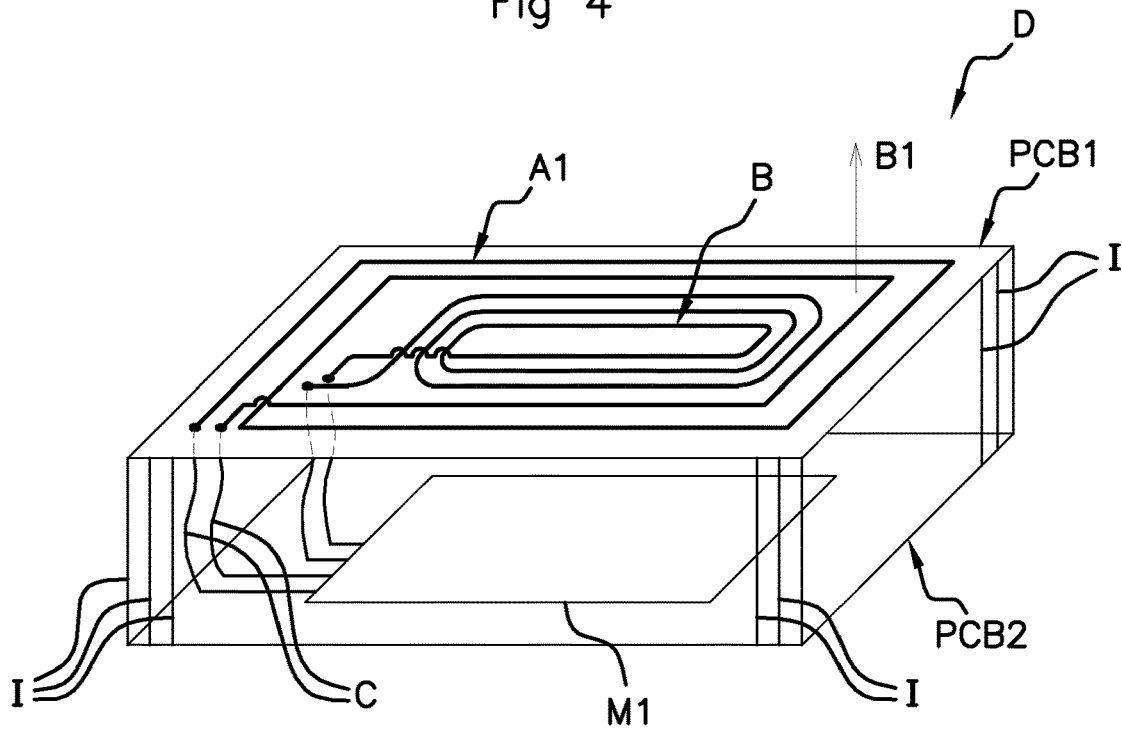
FIG. 4 shows the first NFC antenna A1 in a communication device D of the prior art, in this case incorporated within an inductive charger and also comprising an inductive charging antenna B.

FIGS. 1 and 4 show a near-field communication device D according to the prior art, in which the near-field communication antenna, or NFC A1, which will be referred to hereinafter as the "first NFC antenna A1", is located below the receiving surface S of said device, more specifically on a first carrier, for example a printed circuit board PCB1, which is incorporated within said device.

Generally, but not exclusively, the NFC antenna A1 is printed on the periphery of the printed circuit board and forms a loop consisting of a plurality of windings.

The device D also comprises first means M1 for activating the first NFC antenna A1, which are incorporated within an electronic circuit 10 located on a second carrier, for example in a printed circuit board PCB2, which is located facing the first carrier PCB1, the two said carriers being mechanically connected by pads I, which are located at the four extremities of said carriers. The first activation means M1 comprise, in a manner known per se, inter alia, means for matching the frequency of the antenna (in the form of capacitors) and an NFC transceiver, and are electrically connected to the first NFC antenna A1.

The expression "to be located facing" is understood to mean that at least part of a carrier is located opposite part of another carrier, the two parts being separated by a distance that is substantially equal to the height of the pads I. The two carriers PCB1 and PCB2 may or may not be identical in size. One carrier may be offset relative to the other carrier in a direction parallel to the plane of the carrier or even perpendicular to the plane of the other carrier. In this case, one of the carriers is inclined relative to the other carrier.

The first NFC antenna A1 is connected by wire, for example, by conductive cables C, to the first activation means M1.

What is understood by "first carrier" is a planar surface made of plastic or metal material, or of resin, or of any other material, to which the first NFC antenna A1 is rigidly connected, which first NFC antenna may be printed on, or attached by attachment means such as clips, bonded, etc. to the first carrier.

The first carrier may be for example a printed circuit board PCB1 on which said first NFC antenna A1 is printed, or a housing bottom or cover within which said first NFC antenna A1 is overmolded or bonded.

What is understood by "second carrier" is a planar surface made of plastic or metal material, or of resin, or of any other material, on which the first means M1 for activating said first NFC antenna A1 are located.

The first carrier PCB1 is connected to the second carrier PCB2 by mechanical support pads I.

The first and second carriers PCB1 and PCB2 are spaced apart by the support pads I so as to prevent problems of interference between the first NFC antenna A1 and the electronic components that are located in the first activation means M1 which could result in the frequency of said first NFC antenna A1 being mismatched.

This is known from the prior art.

FIG. 4 shows, by way of illustration, an inductive charging antenna B, such as a WPC antenna, which is located in the center of the communication device D in the case that said communication device D is included in an inductive charger.

FIG. 1 also shows a portable user apparatus, in this example a smartphone, P, placed on the receiving surface S of the communication device D, said portable user apparatus P comprising a near-field communication antenna A in order to communicate with the communication device D. Said antenna A is located at the top of the back face of the portable apparatus P, the back face being the face placed on the receiving surface S.

The first NFC antenna A1 emits an electromagnetic field B1, the main component of which is perpendicular to the receiving surface S and defines a communication zone Z1 (see FIG. 1).

Since the user apparatus comprises an NFC antenna A located at one end of its back face (i.e. the face facing the receiving surface S), the NFC antenna S is located neither facing the first NFC antenna A1, nor centered relative to the first NFC antenna A1 of the communication device D.

Additionally, depending on its dimensions, in this instance its length, the user apparatus P is larger than the length L of the first NFC antenna A1 of the communication device (see FIG. 2), as is the case for certain large smartphones on the market such as the Nokia 830®, the Sony Xperia Z3®, the HTC® One M8, the iPhone 6 etc., so the NFC antenna A of said portable user apparatus is no longer located entirely within the communication zone Z1 of the first NFC communication antenna A1, or not located therewithin at all.

As explained above, effective NFC communication between the communication device D and the portable apparatus P is affected and is substantially limited or even, in some cases, impossible.

An aspect of the invention aims to overcome this problem.

The near-field communication device D' according to an aspect of the invention is illustrated in FIGS. 2, 5, 7, 8 and 9.

According to an aspect of the invention, the mechanical support pads I' are made of conductive metal and the near-field communication device D' further comprises at least one second NFC antenna A2 in the form of windings, for example copper wires, such that a first portion A21 of each winding is located at one end of the first carrier PCB10 and that a second portion A22 of each winding is located at one end of the second carrier PCB20, the two ends being located on one and the same side of the device, one above the other. Preferably, the two ends are located facing one another.

Ingeniously, an aspect of the invention proposes that the first portion A21 of each winding be electrically connected to the second portion A22 of said winding by the pad I' made of conductive metal. According to an aspect of the invention, the pad I' made of conductive metal therefore not only acts as a mechanical support but also forms part of the second NFC antenna A2 (see FIG. 5).

The pads I' made of conductive metal, for example of copper, thus allow signals to be transmitted through the second NFC antenna A2.

The communication device D' according to an aspect of the invention also comprises second activation means M10 that are connected to said second NFC antenna A2.

Figure 5:
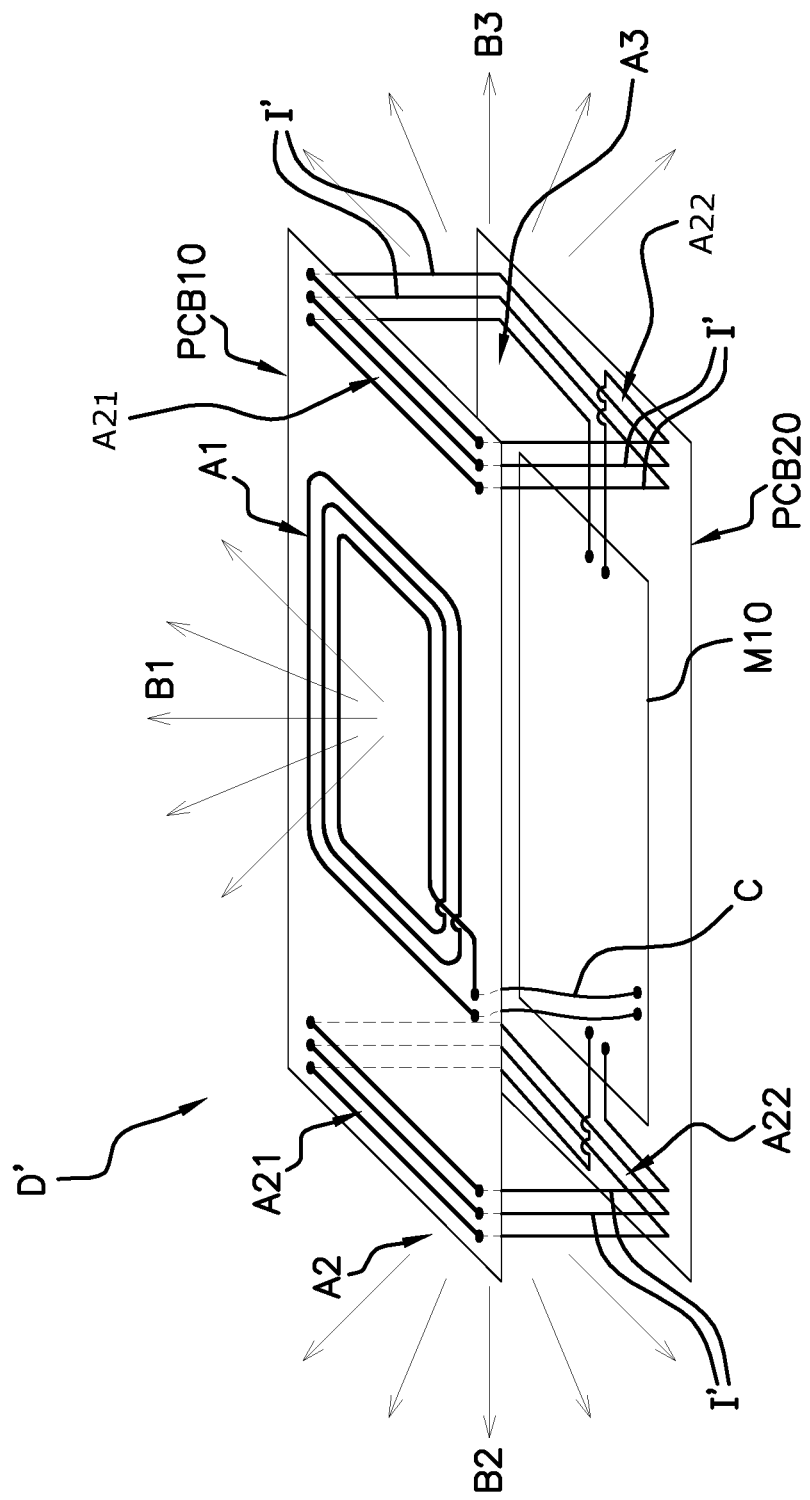
FIG. 5 shows a near-field communication device D' according to an aspect of the invention, further comprising two second near-field communication antennas A2 and A3.

FIG. 5 shows two second NFC antennas, A2 and A3, each of which is located at an opposite end of the first and second carriers PCB10 and PCB20.

The second NFC antenna A2 thus consisting of windings formed between the first carrier PCB10, the second carrier PCB20 and the pads I' generates a second magnetic field B2, a main component of which is perpendicular to the main component of the magnetic field B1 emitted by the first NFC antenna A1.

Similarly, the second NFC antenna A3 thus consisting of windings formed between the first carrier PCB10, the second carrier PCB20 and the pads I' generates a third magnetic field B3, a main component of which is perpendicular to the main component of the magnetic field B1 emitted by the first NFC antenna A1.

Figure 2:
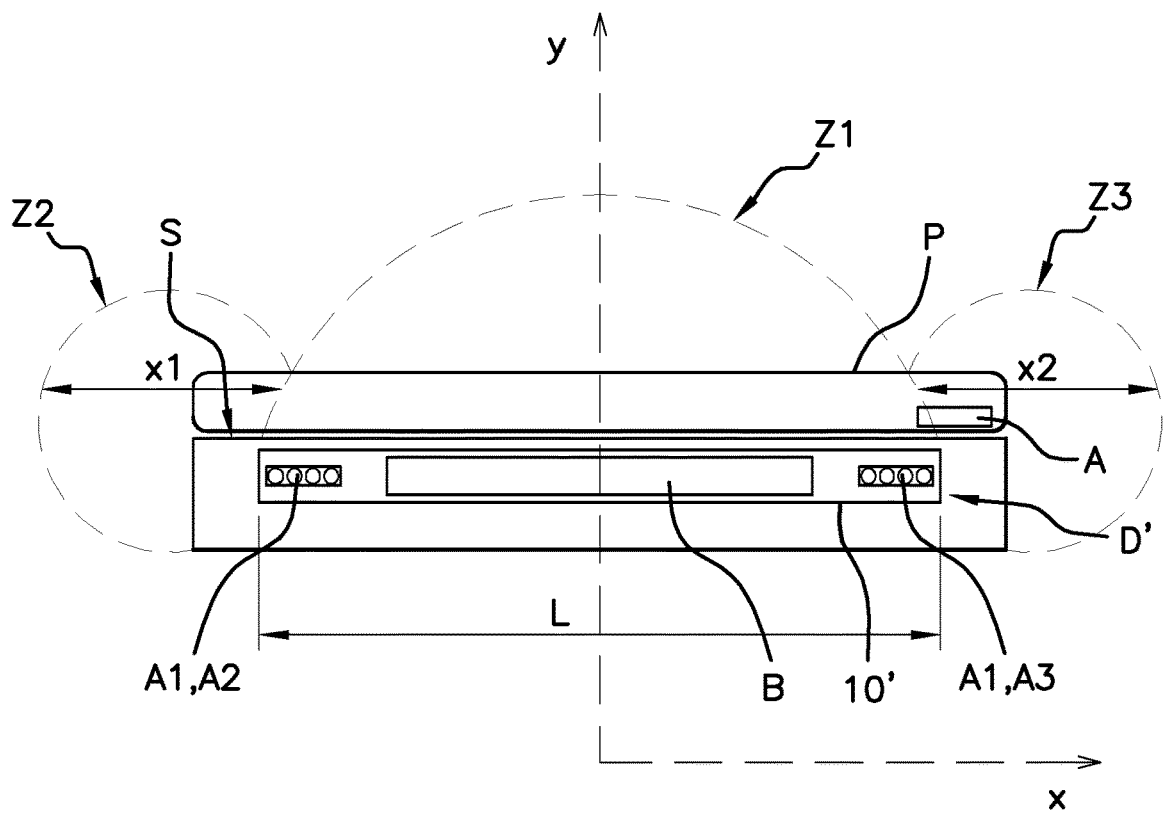
FIG. 2 shows a portable user apparatus P placed on a near-field communication device D' according to an aspect of the invention, further comprising two second near-field communication antennas A2 and A3.

This is illustrated in FIG. 2.

In FIG. 2, two axes that are perpendicular to one another are defined relative to the plane of the first NFC antenna A1 (i.e. relative to the plane of the receiving surface S, which is preferably parallel to said first NFC antenna A1): a longitudinal axis x, parallel to the plane of the first NFC antenna A1, and a transverse axis y, perpendicular to said plane.

The electromagnetic field B1 generated by the first NFC antenna A1 is oriented mainly in the direction y, while the second electromagnetic field B2 emitted by the second NFC antenna A2 is oriented mainly in the direction x, thereby creating a second communication Z2 that preferably extends in the direction x from the edges of the first and second carriers PCB10 and PCB20.

The expression "mainly" in a direction is understood to mean that the main component of the electromagnetic field runs in a direction; it is of course obvious that a magnetic field generated by windings results in a field composed of field lines that are located on either side of the main component and slightly inclined such as shown in FIGS. 1,

4 and 5. It is, inter alia, this incline in the field lines of the second antennas A2 and A3 relative to the main component which ingeniously allows, according to an aspect of the invention, the detection zone to be expanded on either side of the zone Z1, not only along the longitudinal axis x, but also along the transverse axis y.

This second detection zone Z2 then allows communication on one of the edges of the communication device D' when a portable user apparatus P is brought close to one of the edges or ends of the device D'.

The second NFC antenna A2 therefore allows a non-negligible expansion of the NFC zone at the lateral edges of the communication device D'.

This is obtained in a similar manner on the other side of the device D' by adding another second NFC antenna A3, which similarly generates a third electromagnetic field B3, the main component of which is oriented along the axis x.

Figure 3:
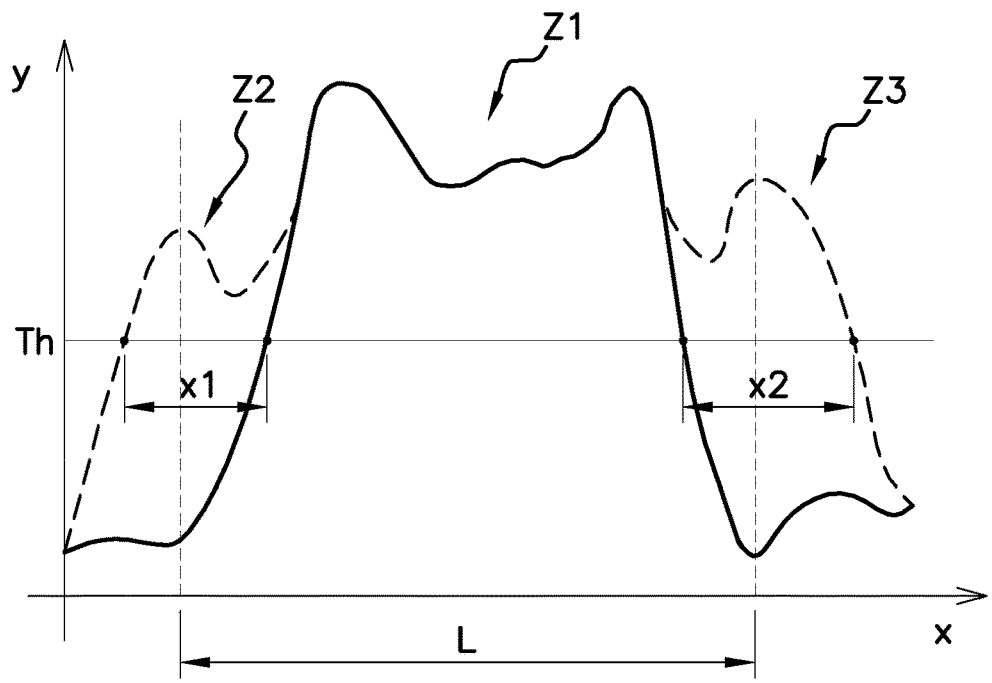
FIG. 3 is a graph representing the near-field communication zone along the longitudinal axis x and across the transverse axis y, defined in relation to the receiving surface S of the communication device, according to the prior art (zone Z1) and according to an aspect of the invention (zones Z1, Z2, Z3)

This is shown graphically in FIG. 3.

In FIG. 3, the intensity of the electromagnetic field is represented along the longitudinal axis x. It can clearly be seen that the two second NFC antennas, A2 and A3, each allow the NFC communication zone to be expanded along the axis x by each creating a magnetic field on each side of the first NFC antenna A1, on one side by a distance x1 and on the other side by a distance x2, respectively, the intensity of which is above a minimum threshold Th required to provide effective NFC.

Figure 7:
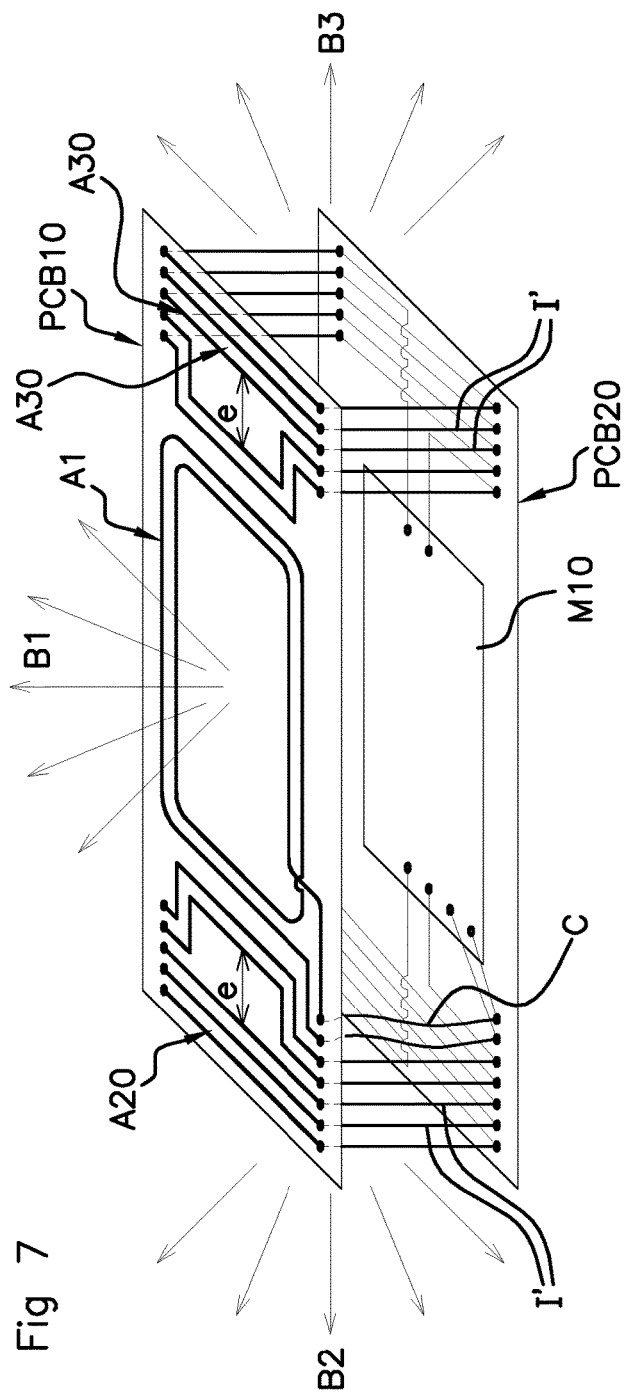
FIG. 7 shows a variant of the two second near-field communication antennas A20 and A30 according to an aspect of the invention.

FIG. 7 shows a variant of the communication device D', wherein the two second NFC antennas A20 and A30 exhibit a distance separation e along the axis x between two of their consecutive windings located on the first carrier PCB10.

This separation e allows the electromagnetic field created by said second NFC antennas A20 and A30 to be expanded, and the communication zones Z3 and Z4 thus created are larger than those Z2 and Z3 created by the second NFC antennas A2 and A3 featuring mutually equidistant windings shown in in FIGS. 2 and 3.

Figure 8:
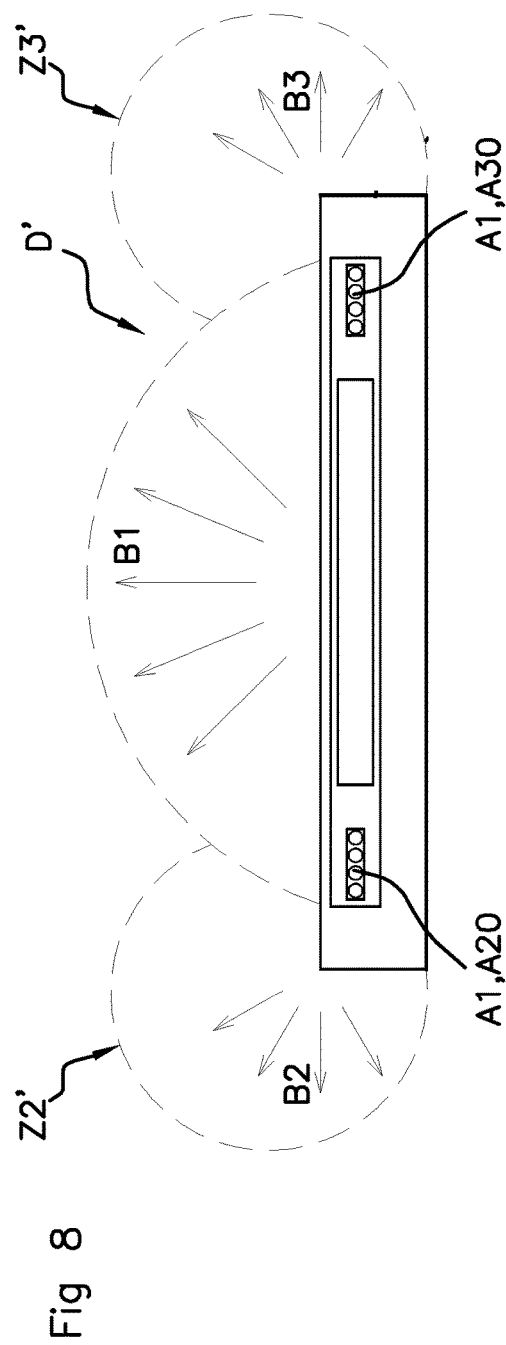
FIG. 8 schematically illustrates the near-field communication zones Z1, Z2' and Z3' obtained with the variant illustrated in FIG. 7.

FIG. 8 shows the communication zones Z2' and Z3' obtained with the variant of the communication device D' illustrated in FIG. 7. Said zones Z2' and Z3' are larger than those Z2 and Z3 illustrated in FIG. 2.

Figure 6:
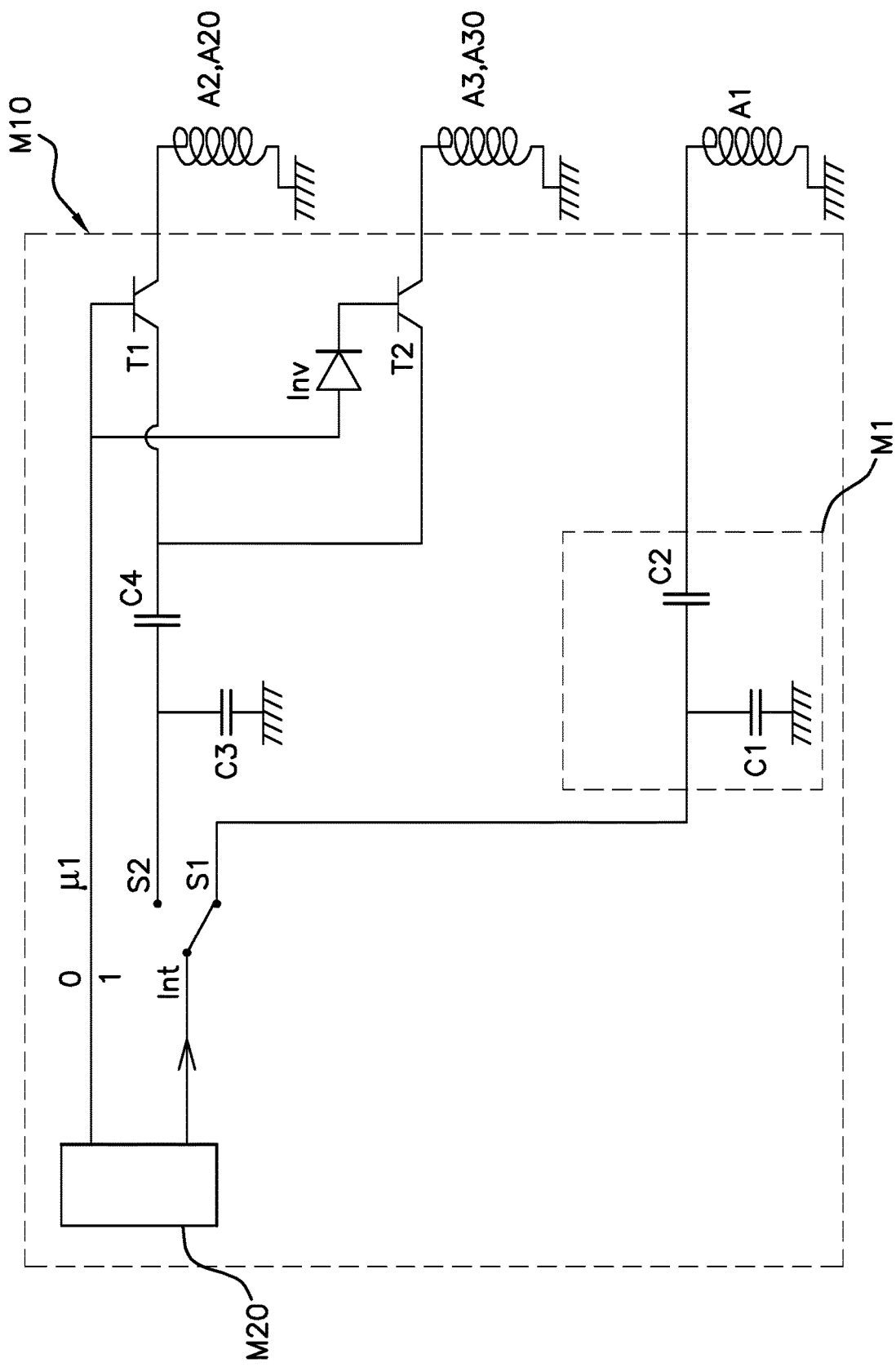
FIG. 6 schematically shows a first embodiment of the second activation means M10 according to an aspect of the invention.

According to an aspect of the invention, the communication device D' also comprises second means M10 for activating the second NFC antenna A2, illustrated in FIG. 6.

The second activation means M10 are included for example in a printed circuit located on the second carrier PCB20.

According to a first embodiment, the second activation means M10 comprise:
  the first activation means M1 further comprise first means for matching the frequency of the first antenna A1, for example in the form of two capacitors C1 and C2;
  second means for matching the frequency of the one or more second antennas A2 and A3, in the form of two capacitors C3 and C4 connected to the two antennas A2, A3;
  a radiofrequency switch Int having two positions: a first position S1 allowing the first activation means M1 and the first NFC antenna A1 to be activated, and a second position S2 allowing the second matching means and the two second NFC antennas A2 and A3 to be activated;
  switching means comprising two transistors T1 and T2, said switching means each being connected to a second NFC antenna A2, A3 and also comprising a control inverter Inv;
  a binary control µ1, allowing one second antenna to be activated and the other second antenna to be deactivated simultaneously via the switching means, i.e. allowing the control inverter Inv to be controlled;
  means M20 for controlling the radiofrequency switch Int and the binary control µ1;
  the control means M20 take, for example, the form of software integrated into a microcontroller.

When the switch Int is in the first position S1, the first NFC antenna A1 is activated and emits the electromagnetic field B1, which defines the communication zone Z1.

When the switch Int is in the second position S2, and the control µ1 is at the binary position 1 (or receives the setpoint 1 from the control means 20), the second NFC antenna A2 is activated and emits the electromagnetic field B2, which defines the communication zone Z2 (or Z2').

When the switch Int is in the second position S2, and the control µ1 is at 0 (or receives the setpoint 0 from the control means 20), the second NFC antenna A3 is activated and emits the electromagnetic field B3, which defines the communication zone Z3 (or Z3').

The binary control µ1 therefore makes it possible to select either of the second communication antennas A2 and A3, which is connected to the second matching means C3 and C4.

The electronic circuit illustrated in FIG. 6 judiciously makes it possible to select, in turn, the first NFC antenna A1, the second NFC antenna A2 or the third NFC antenna A3.

Of course, the first and second outputs S1 and S2 could be connected directly to the control means M20 (without switch Int) such that the first antenna A1 is always activated when either of the second antennas, A2 and A3, is activated.

Figure 9:
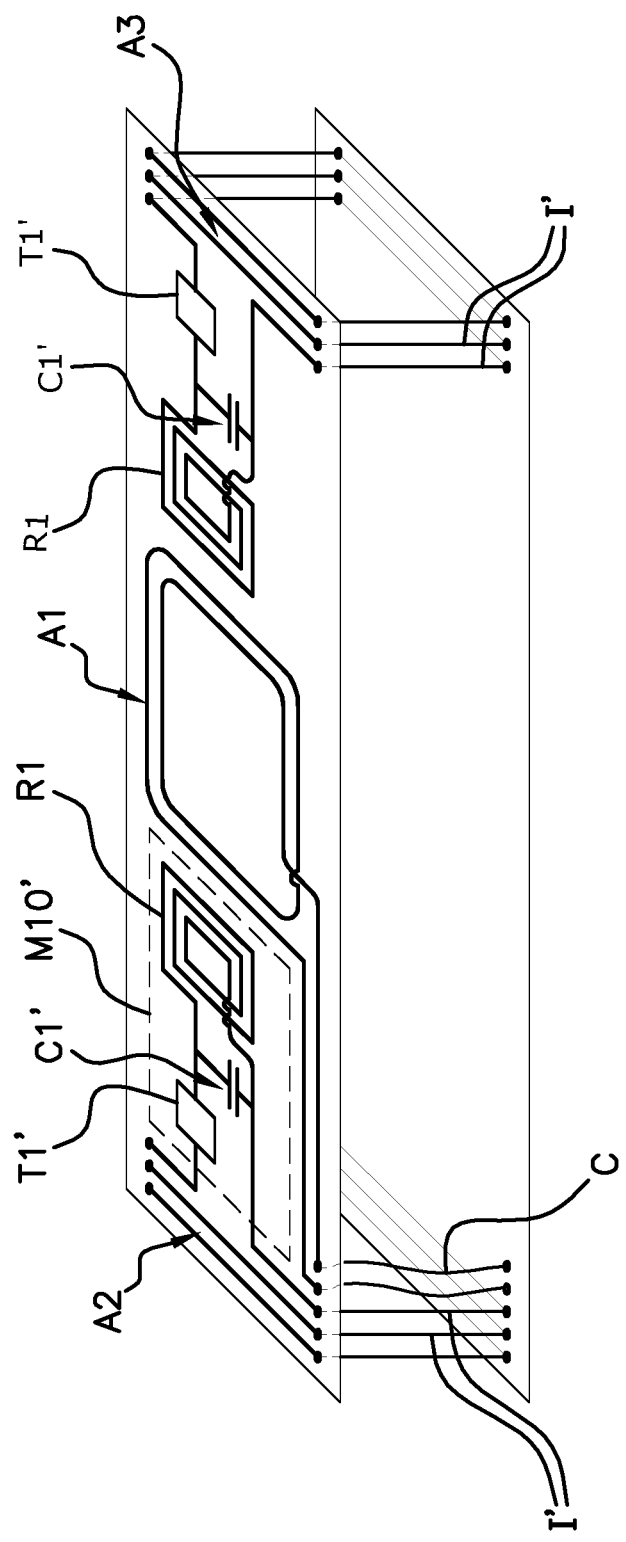
FIG. 9 shows a second embodiment of the second activation means M10' according to an aspect of the invention.

According to a second embodiment illustrated in FIG. 9, the second activation means M10' which are electrically connected to the second antenna A2 or A3 comprise:
  a passive resonator R1, in the form of a loop of windings made of conductive metal, for example of copper; connected to
  a capacitor C1'; and to
  a transistor T1'.

The passive resonator R1 is located in proximity to the first NFC antenna A1 in such a way that it is electromagnetically coupled to the first NFC antenna A1, thereby allowing a current to be generated through the resonator R1 which thus supplies the second NFC antenna A2 with current.

In this second embodiment of the second activation means M10', the first antenna A1 and the one or more second antennas A2, A3 operate simultaneously, and not in alternation as is the case for the first embodiment illustrated in FIG. 6.

An aspect of the invention is applicable to any portable-apparatus inductive charger comprising an inductive charging antenna and a near-field communication device.

An aspect of the invention may also be applied to the portable apparatus itself. Specifically, the communication device according to an aspect of the invention may be incorporated within a portable user apparatus so that it is able to communicate with any type of inductive charger or any near-field communication device. With the communication device according to an aspect of the invention incorporated with the portable apparatus, said apparatus may communicate more effectively, since it has a plurality of effective communication zones.

An aspect of the invention is therefore judicious in that it allows the NFC zone to be expanded at the edges of the communication device D' through the addition of secondary antennas A2 and A3 on the two carriers, using mechanical support pads I' as conductors.

An aspect of the invention is therefore based on the winding of the second antennas on the two carriers via the conductive metal pads.

An aspect of the invention is therefore straightforward to implement, inexpensive and solves the problems of the prior art.

The invention claimed is:

1. A device for near-field communication with a portable user apparatus, comprising:
   a first near-field communication antenna located on a first carrier;
   first means for activating said first antenna that are located on a second carrier, which is located directly facing the first carrier and mechanically connected to said first carrier by pads;
   a second near-field communication antenna, a first winding portion of which is located on one end of the first carrier and a second winding portion of which is located on one end of the second carrier, the two ends being located on one and the same side of the device;
   second means for activating said second communication antenna,
   the pads of the device are made of conductive metal and:
   the first portion and second portion of each winding are electrically connected by a pad made of conductive metal, such that the second antenna emits an electromagnetic field, a main component of which is perpendicular to a main component of the electromagnetic field emitted by the first near-field communication antenna.

2. The near-field communication device as claimed in claim 1, wherein the first carrier comprises a housing bottom or cover, and the second carrier is a printed circuit board.

3. The near-field communication device as claimed in claim 1, wherein the first carrier and the second carrier are printed circuit boards.

4. The near-field communication device as claimed in claim 1, wherein the first winding portion comprises a distance separation between two consecutive windings.

5. The near-field communication device as claimed in claim 1, wherein the device comprising two second near-field communication antennas, which are located at the opposite ends of the first and second carriers, wherein the second activation means comprise:
   a radiofrequency switch having two positions: a first position in which the switch is connected to first frequency-matching means and to the first communication antenna, and a second position in which the switch is connected to second frequency-matching means and to the two second communication antennas;
   switching means comprising two transistors, said switching means each being connected to one of the second NFC antennas and also comprising a control inverter;
   a binary control of the switching means, which is connected to a control inverter, allowing one second communication antenna to be activated and the other second communication antenna to be deactivated simultaneously; and
   means for controlling the radiofrequency switch and the binary control.

6. The near-field communication device as claimed in claim 1, wherein the second activation means comprise at least one passive resonator that is electromagnetically coupled on one side to the first communication antenna, antenna-matching means and a transistor, which are electrically connected on one side to the second communication antenna and on the other side to the resonator.

7. The near-field communication device as claimed in claim 1, wherein the pads are formed on a surface of one of the first carrier and the second carrier directly facing an other one of the first carrier and the second carrier, such that a height of the pads defines a distance between the first and second carriers.

8. An inductive charger comprising an inductive charging antenna, wherein a first communication antenna surrounds an inductive charging antenna and an inductive charger comprises a near-field communication device as claimed in claim 1.

9. A portable user apparatus, comprising a near-field communication device as claimed in claim 1.

10. A motor vehicle comprising a near-field communication device as claimed in claim 1.

11. A motor vehicle comprising an inductive charger as claimed in claim 8.

* * * * *